United States Patent
Das et al.

(10) Patent No.: US 9,920,222 B2
(45) Date of Patent: Mar. 20, 2018

(54) SYSTEM AND METHOD FOR DISPENSING HOT MELT ADHESIVES

(71) Applicant: Nordson Corporation, Westlake, OH (US)

(72) Inventors: Suprotik Das, Bangalore (IN); Sheenfar S. Fong, Suwanee, GA (US); Akio Otsuka, Chiba (JP); Laurence B. Saidman, Duluth, GA (US)

(73) Assignee: Nordson Corporation, Westlake, OH (US)

( * ) Notice: Subject to any disclaimer, the term of this patent is extended or adjusted under 35 U.S.C. 154(b) by 0 days.

(21) Appl. No.: 14/931,355

(22) Filed: Nov. 3, 2015

(65) Prior Publication Data

US 2016/0122592 A1    May 5, 2016

Related U.S. Application Data

(60) Provisional application No. 62/074,827, filed on Nov. 4, 2014, provisional application No. 62/174,123, filed on Jun. 11, 2015.

(51) Int. Cl.
*B67D 7/80* (2010.01)
*C09J 5/00* (2006.01)
(Continued)

(52) U.S. Cl.
CPC ............... *C09J 5/00* (2013.01); *B05C 5/0279* (2013.01); *B05C 11/1007* (2013.01);
(Continued)

(58) Field of Classification Search
CPC . C09J 5/00; C09J 153/00; C09J 153/02; C09J 163/00; C09J 175/04; C09J 177/00;
(Continued)

(56) References Cited

U.S. PATENT DOCUMENTS 767,078 A * 8/1904 Mueller ................ B23Q 7/055
226/139
2,867,592 A    1/1959 Morris et al.
(Continued)

FOREIGN PATENT DOCUMENTS

WO    0179111 A1    10/2001

OTHER PUBLICATIONS

International Application No. PCT/US2015/058974: International Search Report and the Written Opinion dated Mar. 31, 2016, 19 pages.
(Continued)

*Primary Examiner* — J. Casimer Jacyna
*Assistant Examiner* — Benjamin R Shaw
(74) *Attorney, Agent, or Firm* — Baker & Hostetler LLP

(57) ABSTRACT

A system for dispensing hot melt adhesives, comprising an adhesive dispenser including a fluid passage leading to an outlet. The system further comprises a supply conduit fluidly connected to the fluid passage and a feeding mechanism configured to feed an elongate, flexible element of solid adhesive into the supply conduit. The system further comprises a first heating element positioned along at least a portion of the supply conduit to melt a portion of the elongate, flexible element being fed into the supply conduit and thereby form a supply of liquid adhesive within the supply conduit.

45 Claims, 10 Drawing Sheets

(51) Int. Cl.
*B05C 11/10* (2006.01)
*B65H 49/26* (2006.01)
*B65H 51/10* (2006.01)
*C09J 175/04* (2006.01)
*C09J 153/02* (2006.01)
*C09J 153/00* (2006.01)
*B29B 13/02* (2006.01)
*C09J 177/00* (2006.01)
*B05B 9/00* (2006.01)
*B05C 5/02* (2006.01)

(52) U.S. Cl.
CPC ...... *B05C 11/1013* (2013.01); *B05C 11/1026* (2013.01); *B05C 11/1042* (2013.01); *B29B 13/022* (2013.01); *B65H 49/26* (2013.01); *B65H 51/10* (2013.01); *C09J 153/00* (2013.01); *C09J 153/02* (2013.01); *C09J 175/04* (2013.01); *C09J 177/00* (2013.01); *B05B 9/002* (2013.01); *B05C 5/0225* (2013.01); *B65H 2404/14* (2013.01); *B65H 2515/40* (2013.01); *C09J 2201/606* (2013.01); *C09J 2201/61* (2013.01); *C09J 2400/22* (2013.01); *C09J 2453/00* (2013.01); *C09J 2475/00* (2013.01)

(58) Field of Classification Search
CPC .............. C09J 2201/606; C09J 2201/61; C09J 2400/22; C09J 2453/00; C09J 2475/00; B05C 5/0279; B05C 5/0225; B05C 11/1007; B05C 11/1013; B05C 11/1026; B05C 11/1042; B29B 13/022; B65H 49/26; B65H 51/10; B65H 2404/14; B65H 2515/40; B05B 9/002; F24H 1/105; F24H 9/128; F24H 9/2028
USPC ........ 222/146.5; 228/41; 392/472, 473, 480; 226/139
See application file for complete search history.

(56) References Cited

U.S. PATENT DOCUMENTS

| | | | | |
|---|---|---|---|---|
| 3,239,103 A * | 3/1966 | Kelley | ................ | B05C 11/1042 118/683 |
| 3,317,368 A * | 5/1967 | Battersby | ............. | B29B 13/022 428/373 |
| 3,318,481 A * | 5/1967 | Phillips | ................ | B29B 13/022 219/421 |
| 3,332,581 A * | 7/1967 | Eastabrooks | ........... | B05B 1/323 137/877 |
| 3,352,278 A * | 11/1967 | Lockwood | ............. | B05C 1/003 118/202 |
| 3,408,008 A * | 10/1968 | Cocks | .................... | B05C 5/001 219/230 |
| 3,604,597 A * | 9/1971 | Pohl | ...................... | B29B 13/022 219/230 |
| 3,868,046 A * | 2/1975 | Maddalena | ......... | B05C 17/0053 222/146.5 |
| 4,317,529 A * | 3/1982 | Leibhard | .......... | B05C 17/00526 219/421 |
| 4,804,110 A * | 2/1989 | Sperry | ............. | B05C 17/00536 222/146.5 |
| 5,094,399 A * | 3/1992 | Zaber | ..................... | B05B 9/002 239/135 |
| 5,462,206 A * | 10/1995 | Kwasie | ............... | B05C 17/0053 222/146.5 |
| 5,865,927 A * | 2/1999 | Puletti | ..................... | B01J 2/003 156/244.11 |
| 5,935,458 A * | 8/1999 | Trapani | .................... | B23K 9/04 219/121.47 |
| 5,957,253 A * | 9/1999 | Clanton | ............... | B65H 75/403 191/12.2 A |
| 6,302,309 B1 * | 10/2001 | Drader | ................ | B29C 47/0016 222/146.5 |
| 6,431,409 B1 * | 8/2002 | Gehde | ................ | B29C 47/0002 222/334 |
| 6,517,891 B1 * | 2/2003 | Estelle | .................. | B05B 12/085 427/424 |
| 2001/0029887 A1 * | 10/2001 | Falck | ........................ | B05C 1/06 118/694 |
| 2003/0080156 A1 * | 5/2003 | Jeter | .................... | B05C 11/1042 222/146.5 |
| 2003/0080307 A1 * | 5/2003 | Jackson | ................ | B05C 5/0258 251/205 |
| 2005/0199673 A1 * | 9/2005 | Enyedy | .................. | B23K 9/125 226/181 |
| 2006/0081675 A1 * | 4/2006 | Enyedy | .................. | B23K 9/125 226/181 |
| 2013/0180971 A1 * | 7/2013 | Peters | .................... | B65H 51/10 219/137.7 |
| 2014/0117049 A1 * | 5/2014 | Varga | .................. | B05C 11/1034 222/146.5 |
| 2014/0263533 A1 * | 9/2014 | Enyedy | ................ | B23K 9/1336 226/181 |
| 2015/0014383 A1 * | 1/2015 | Patterson | ............... | B65H 51/32 226/181 |

OTHER PUBLICATIONS

International Patent Application No. PCT/US2015/058974: International Preliminary Report dated May 18, 2017, 12 pages.

* cited by examiner

SYSTEM AND METHOD FOR DISPENSING HOT MELT ADHESIVES

CROSS-REFERENCE TO RELATED APPLICATIONS

This application claims the benefit of U.S. Provisional Patent Application Ser. No. 62/074,827, filed on Nov. 4, 2014, and U.S. Provisional Patent Application Ser. No. 62/174,123, filed Jun. 11, 2015, the disclosures of which are incorporated by reference herein in their entirety.

FIELD OF THE INVENTION

The present invention generally relates to dispensing hot melt adhesives.

BACKGROUND

Hot melt adhesive systems have many applications in manufacturing and packaging. For example, thermoplastic hot melt adhesives are used for carton and case sealing, tray forming, pallet stabilization, nonwoven applications including diaper manufacturing, and many other applications. Hot melt adhesives are typically produced in the form of adhesive "solids," which include solid or semi-solid pellets and/or particulates. These hot melt adhesive solids are transferred to a melter where the hot melt adhesive solids are melted into a molten liquid form at a desired application temperature. The liquid hot melt adhesive is ultimately dispensed at the application temperature to an object such as a work piece, substrate or product by a dispensing device suitable to the manufacturing or packaging application. Despite the success of such systems, there are drawbacks. For example, the adhesive solids are prone to clumping together, which prevents the solids from being transferred into the melter. Current methods for avoiding clumping or sticking together of adhesive are limited, and/or add complexity to the already complicated systems.

Moreover, meeting demand for adhesive dispensing devices often requires a large amount of molten adhesive to be maintained in the melter. Where some portions of the molten adhesive remain in the melter for extended periods of time, the liquid adhesive may degrade or become charred, thus affecting the quality of the adhesive bonding qualities of the liquid adhesive. There is therefore a need to address these and other issues in the art.

SUMMARY

To that end, a system for dispensing hot melt adhesives is provided and comprises an adhesive dispenser including a fluid passage leading to an outlet. The system further comprises a supply conduit fluidly connected to the fluid passage and a feeding mechanism configured to feed an elongate, flexible element of solid adhesive into the supply conduit. The system further comprises a first heating element positioned along at least a portion of the supply conduit to melt a portion of the elongate, flexible element being fed into the supply conduit and thereby form a supply of liquid adhesive within the supply conduit.

A method of dispensing hot melt adhesives using a system is provided. The system includes a supply conduit fluidly connected to a hot melt adhesive dispenser. The hot melt adhesive dispenser includes a fluid passage in fluid communication with an outlet. The method comprises feeding a portion of an elongate, flexible element of solid hot melt adhesive into the supply conduit. The method further comprises heating at least a portion of the elongate, flexible element within the supply conduit to form a supply of liquid adhesive within the supply conduit. The method further comprises advancing the elongate, flexible element relative to the supply conduit to direct at least a portion of the liquid adhesive from the supply conduit into the fluid passage of the adhesive dispenser.

Various additional aspects and features of the invention will become more readily apparent to those of ordinary skill in the art upon review of the following detailed description of the illustrative embodiments.

DETAILED DESCRIPTION

Figure 1:
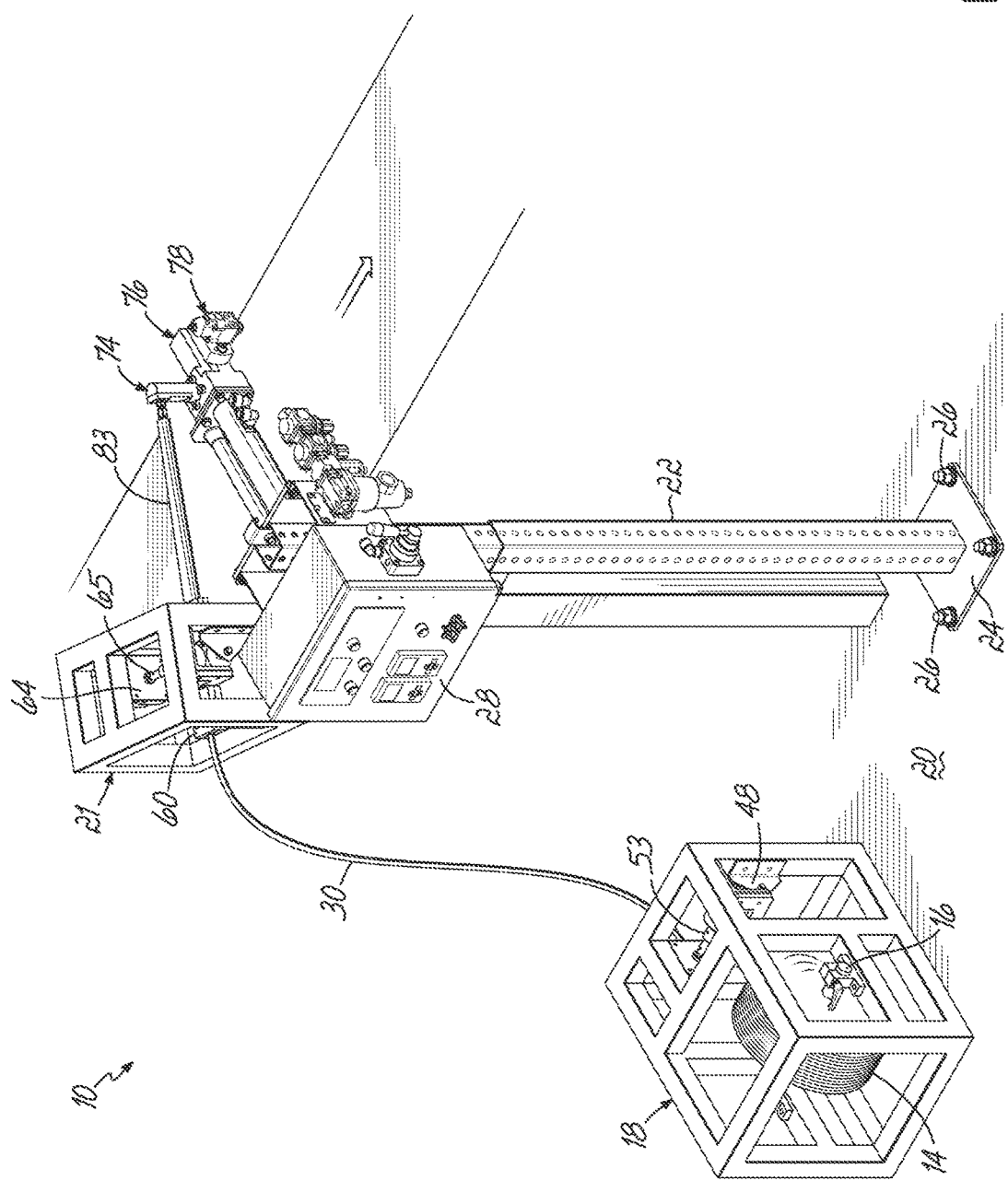
FIG. 1 is one embodiment of a system for dispensing hot melt adhesives.
Figure 2:
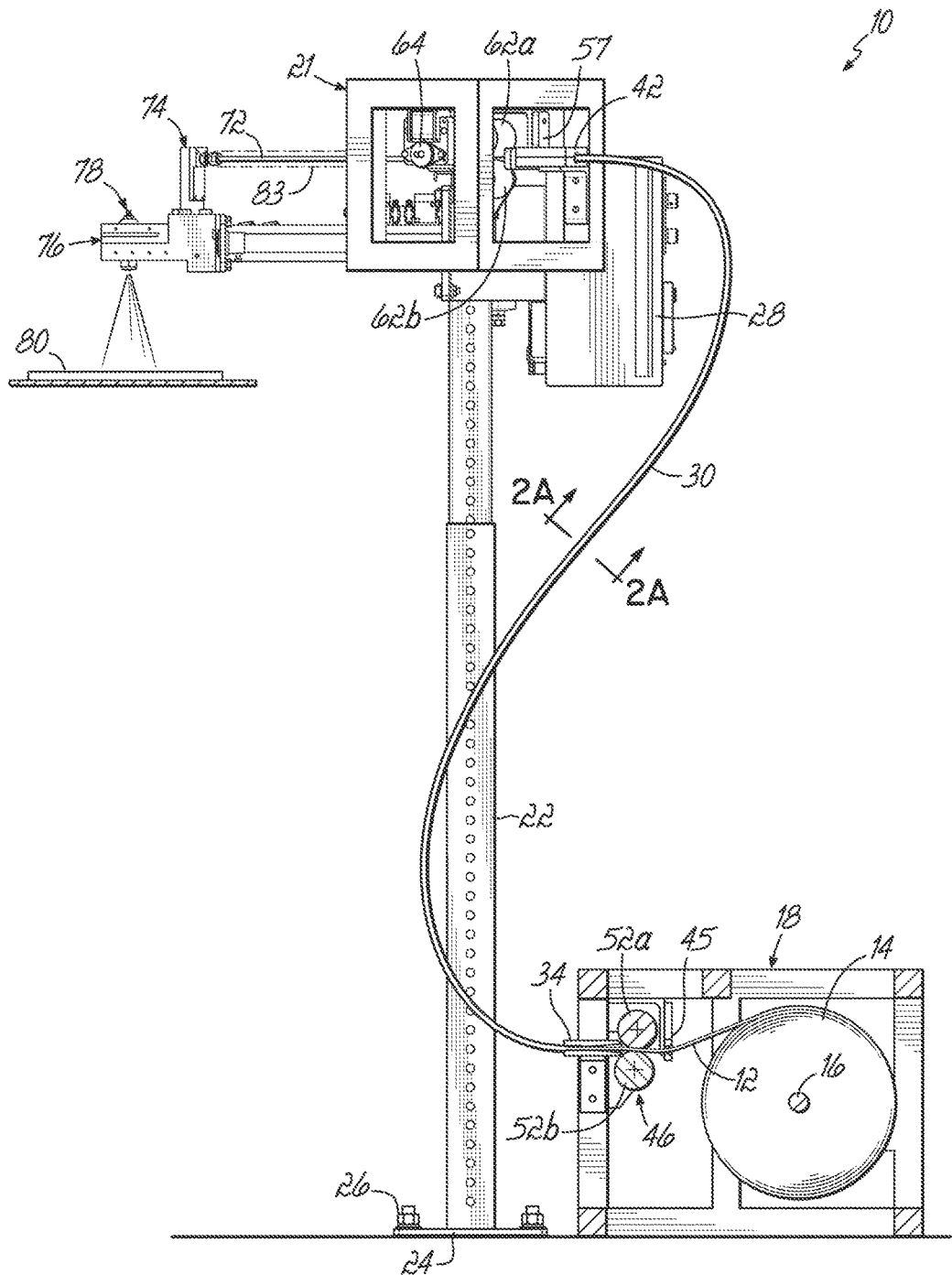
FIG. 2 is a side view of the system of FIG. 1.
Figure 2A:
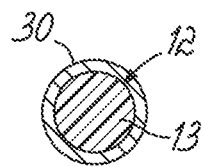
FIG. 2A is a cross-sectional view of one embodiment of an elongate, flexible cord of solid adhesive, taken along line 2A-2A of FIG. 2.
Figure 2B:
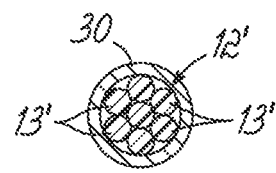
FIG. 2B is a cross-sectional view similar to FIG. 2A but showing an alternative embodiment of the cord of solid adhesive.

A system 10 for dispensing hot melt adhesives is shown in FIGS. 1 through 4. The system 10 includes a supply of solid hot melt adhesive in the form of an elongate, flexible cord 12 rolled into a spool 14. The spool 14 is mounted for rotation on a spool axle 16 coupled to a first support structure 18. The cord 12 may take many forms of elongate, flexible elements. The cord 12, as shown, is essentially a single, unitary filament 13 (FIG. 2A) of solid hot melt adhesive. However, in other embodiments, the cord may include more than one filament of solid adhesive, such as two or more. For example, in one embodiment, the cord 12' may include several filaments 13' in a braided or twisted configuration (FIG. 2B).

Figure 2C:
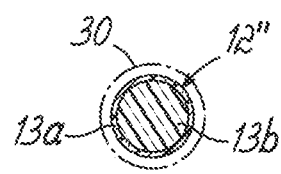
FIG. 2C is a cross-sectional view similar to FIG. 2A but showing an alternative embodiment of the cord of solid adhesive.

It will be appreciated that many solid hot melt adhesives may degrade or prematurely cure due to moisture in atmosphere or other environmental conditions. For example, a reactive moisture-curing hot melt polyurethane adhesive or hot melt PUR may prematurely cure when exposed to atmospheric moisture. Therefore, in other embodiments, the cord may be a two layer cord 12" and may include a coating material 13a covering a unitary filament 13b of solid hot melt adhesive, such as a reactive moisture-curing hot melt polyurethane adhesive or hot melt PUR (FIG. 2C). The unitary filament 13b is protected from atmospheric moisture (i.e., water vapor) by the coating material 13a, which defines a moisture barrier and includes a meltable polymer and an optional structuring agent (not shown).

The structuring agent may include clay, silicates and silicas, starches, phospholipids, pillared materials, metal salts, nanoplatelets, and mixtures thereof. In certain embodiments, the structuring agent may be dispersed in the meltable polymer. The coating material 13a may comprise an interior layer of the meltable polymer, and an exterior layer of the structuring component. In some embodiments, the coating material may be formed by extrusion methods. For example, the coating material 13a can be made in the form of a tube or sheet, with the hot melt polyurethane adhesive being extruded therein. In certain embodiments, the coating material 13a may disperse into the hot melt polyurethane adhesive upon extrusion of the composition and may not form gels or particles.

As used herein, a "reactive, moisture-curing hot melt polyurethane adhesive" or "hot melt PUR" 13b is understood to be an adhesive that is largely free of solvents, which is solid at room temperature, and following application in the form of its melt, physically binds not only by cooling, but also by 1) a chemical reaction between an isocyanate-functionalized component and a polyol component, and 2) a chemical reaction of still present isocyanate groups with moisture. It is only subsequent to such chemical curing, with concomitant crosslinking and/or increase in molecule size that the adhesive receives its final characteristics. In some embodiments, the reactive moisture-curing hot melt polyurethane adhesive may comprise an isocyanate-functionalized polyurethane prepolymer, a polyisocyanate, or combinations thereof, and at least one polyol.

With regard to the coating material 13a, which defines a moisture barrier surrounding the hot melt PUR 13b, the coating material 13a need not absolutely block the transmission of any and all water vapor. For long term storage, the hot melt PUR 13b can still be packaged in a metal foil bag or the like. Accordingly, the coating material 13a should slow moisture ingress during transport from the shipping container to the melter apparatus. For example, the coating material 13a can have a moisture vapor transmission rate of about 5 nmol/(m$^2$ sec) or less at 38° C. and 90% relative humidity (rh). In another example, the moisture vapor transmission rate of the cord 12 to be coated is about 1 nmol/(m$^2$ sec) or less at 38° C. and 90% relative humidity (rh). The moisture vapor transmission rate of the cord 12 to be coated can be measured using PERMATRAN-W® Model 3/33 Plus device.

Coating material 13a, which comprises a meltable polymer, can be chemically neutral to the hot melt PUR 13b. The coating material 13a also can be chemically compatible with the hot melt PUR 13b. The coating material 13a also can comprise a material that has non-adhesive properties outwardly, but reacts with the hot melt PUR 13b at an interface layer between the coating material 13a and the hot melt PUR 13b. In all these cases, the coating material 13a can be processed along with the hot melt PUR 13b during the subsequent use of the protected hot melt PUR 13b without needing to be detached from the protected hot melt PUR 13b. Thus, in accordance with embodiments of the present invention, coating material 13a is capable of dispersing into the melted hot melt PUR 13b and advantageously does not form gels or particles, which could clog the discharge nozzle(s) of the melter apparatus. To facilitate the dispersion of the coating material 13a, according to one aspect of the coating material 13a, its melting temperature is equal to or less than a melting temperature of the hot melt PUR 13b. The protected reactive hot melt polyurethane adhesive composition may comprise a reactive moisture-curing hot melt polyurethane adhesive, and a coating material defining a water vapor barrier that surrounds the hot melt polyurethane adhesive, where the coating material comprises a meltable polymer.

In an embodiment of the present invention, the meltable polymer can be selected from any suitable known or after-developed polymers. For example, the polymer can be selected from, but is not limited to, vinylidene chloride copolymers, high density polyethylenes, cyclic olefin copolymers, polypropylene, amorphous nylon, ethylene-vinyl alcohol, polyethylene terephthalate, polyvinyl chloride, polyamino ether resins, nitrile barrier resins, polystyrene, or polycarbonate, or combinations thereof.

Although the above-described meltable polymers may exhibit sufficient water vapor barrier properties by themselves, other meltable polymers may not. Accordingly, the coating material 13a may further comprise a structuring agent, wherein the structuring agent decreases water permeability through the coating material 13a. In some embodiments, the meltable polymer may comprise pendant ionic groups. Such pendant ionic groups may provide increased water barrier properties by interacting with ionic groups in the structuring agent, where present, to provide tighter interstitial spacing and thus decreased water vapor permeability. Thus, according to some embodiments of the present invention, the coating material 13a includes both the meltable polymer as described above, and the structuring agent. In another example, the meltable polymer is a thermoplastic.

If desired, other additives can be included in the coating material 13a, such as antioxidants, amino acid residues, phospholipids, sugars, crosslinking agents, colorants, and the like. Such materials can be included in known amounts for their known purposes. For example, further enhancement of the water barrier properties can be achieved when antioxidants, amino acid residues, phospholipids, and/or sugars are added to the formulation.

Encapsulation of the hot melt PUR 13b by the coating material 13a can be conducted according to any desired method, whether known or after-developed, that is effective in depositing the coating material around the hot melt PUR to provide the water vapor barrier. As noted above, the water vapor barrier need not be completely water impermeable to prevent significant water permeation over a desired time period or shelf-life. Accordingly, the thickness of the coating material may be varied to impart the desired water vapor transmission rate property.

Exemplary but non-limiting methods for forming the protected hot melt PUR include co-extrusion of the hot melt PUR and its coating layer or extrusion of the hot melt PUR into a preformed sheath of coating material.

In another embodiment, the hot melt PUR 13b may be substituted with a pressure sensitive hot melt adhesive, or hot melt pressure sensitive adhesive (PSA). It will be appreciated that hot melt PSA is commonly used, for example, in the non-wovens industry. However, hot melt PSA is known to be relatively tacky, which may cause the hot melt PSA to become snagged or otherwise trapped by a feeding mechanism (described below) or other portion of the system 10, thereby disrupting the advancement of the cord. Therefore, the cord 12" may include a coating material 13*a* covering the hot melt PSA 13*b*. In this embodiment, the coating material 13*a* may be substantially non-tacky, so as to ensure that the cord 12" does not become snagged or otherwise trapped by any portion of the system 10. The adhesive may have a protective coating that prevents it from sticking to itself or other contaminants. In a manner similar to that previously described with respect to the hot melt PUR 13*b*, the coating material 13*a* is capable of dispersing into the melted hot melt PSA 13*b* without forming gels or particles. The coating material and the hot melt pressure sensitive adhesive may be co-extruded. In certain embodiments, the PSA may include one or more styrene block copolymers, such as poly(styrene-butadiene-styrene) (SBS), poly(styrene-isoprene-styrene) (SIS), and poly(styrene-ethylene/butylene-styrene) (SEBS), for example.

Figure 2D:
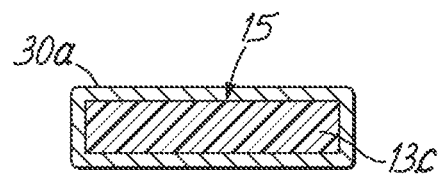
FIG. 2D is a cross-sectional view similar to FIG. 2A but showing an alternative embodiment of the cord of solid adhesive.
Figure 2E:
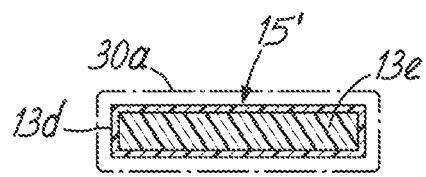
FIG. 2E is a cross-sectional view similar to FIG. 2A but showing an alternative embodiment of the cord of solid adhesive.

In another embodiment, an elongate, flexible ribbon 15 of solid hot melt adhesive may be used (FIG. 2D). The ribbon 15 may be flat, and would potentially have a higher surface-to-volume ratio than the previously described cord 12, which may reduce the amount of heat transfer necessary to produce the required liquefied adhesive as further described below. As shown, the ribbon 15 may be essentially a single, unitary filament 13*c* of solid hot melt adhesive. However, in other embodiments, the ribbon may include more than one filament of solid adhesive, such as two or more. In still other embodiments, the ribbon may be a two layer ribbon 15' and may include a coating material 13*d* covering a unitary filament 13*e* of solid hot melt adhesive (FIG. 2E), in a manner similar to that previously described with respect to cord 12".

As shown, the first support structure 18 is generally rectangular in cross section. The first support structure 18 is shown to be placed on a ground surface 20, but may be elevated in a similar manner as the second support structure 21. In that regard, the second support structure 21 is mounted on a height adjustable post 22 that is bolted to the ground surface 20 via a base 24 and a plurality of fasteners 26. The second support structure 21 is also generally rectangular shaped in cross-section. A control module 28 is also mounted to the post 22. As shown, a length of tube or tubing 30 extends between the first support structure 18 and a second support structure 21. The tube 30 may be used to assist in the transportation of the cord 12 between the first and second support structures 18, 21, generally, as the cord 12 is advanced. When a ribbon 15 is used, a tube 30*a* having a substantially rectangular cross section may be used to accommodate the shape of the ribbon 15. However, it will be understood that any type of guide system, pulley system, etc., may be used instead of or in addition to the tube 30. More particularly, the tube 30 is coupled at its first end 32 to a first elongated guide element 34 that is coupled to the first support structure 18. The first elongated guide element 34 includes a lumen 36 having a tapered inlet portion 38 that allows the cord 12 to enter the first elongated guide element 34, and subsequently enter a lumen 40 of the tube 30. A second end 41 of the tube 30 is coupled to a tube support member 42 that is coupled to the second support structure 21. The tube 30 is advantageous in that, should the cord 12 break at any point, the feeding mechanism (described below) will still be able to direct the cord 12 through the tube 30 to the second support structure 21. It is also possible to incorporate a sensing system to detect if the cord breaks. For example, tension on the cord may be sensed, or a proximity sensor may be used to sense a break in the cord, then the control may perform a suitable function such as emitting a signal to an operator for purposes of performing appropriate maintenance.

The first support structure 18 includes a first guide member 44, mounted on a bracket 45, that generally guides the cord 12 towards a feeding mechanism 46. The feeding mechanism 46 feeds the cord 12 into, and advances the cord 12 relative to, other parts of the system 10. As one example, the feeding mechanism 46 includes first motor 48 and a first set of rollers 50. The first set of rollers 50 includes a first driven roller 52*a* that is operably connected to a first motor 48 via a drive shaft 53, and a first idler roller 52*b*. The first set of rollers 50 is positioned such that the outer surfaces 54*a*, 54*b* of each roller 52*a*, 52*b*, respectively may frictionally engage opposite sides of the cord 12 to advance the cord 12. In one embodiment, the outer surfaces 54*a*, 54*b* may include a textured surface or coating (not shown) that increases their respective coefficients of friction. Alternatively or in addition, the outer surface of the cord 12 may be textured, such as in a complementary manner to the texture on the outer surfaces 54*a*, 54*b*. This can, for example, create an interlocking effect between the cord and the outer surfaces 54*a*, 54*b* thereby allowing greater forces to be applied. As another option, the outer surfaces 54*a*, 54*b* may have protrusions such as teeth that cut or depress into the cord 12 and thereby create additional grip and force application ability. In order to advance the cord 12, an initial portion of the cord 12 is passed through guide member 44 and engaged with the first set of rollers 50. This may require a user to manually direct the cord 12 through the guide member 44 and into engagement with the first set of rollers 50. Once the first set of rollers 50 engages the initial portion of the cord 12 from the spool 14, the first motor 48 is operated to cause rotation of the drive shaft and thus the driven roller 52*a*. Because of the frictional engagement between the cord 12 and the idler roller 52*b*, as well as between the driven roller 52*a* and the cord 12, the rotation of driven roller 52*a* also causes the rotation of idler roller 52*b*. In that regard, the driven roller 52*a* of the first set 50 rotates in a first direction (clockwise as shown) and the idler roller 52*b* of the first set 50 rotates in a second direction (counterclockwise as shown). The cord 12 is advanced through the tube 30 to the second support structure 21 and exits the tube 30. The cord 12 traverses through another, second guide member 56, mounted on a bracket 57, that is configured to align the cord 12 with a second set of rollers 58 of the feeding mechanism 46, and also to align the cord 12 with another, second elongated guide element 60. As described below, the second elongated guide element 60 acts as an insulating element and thus also may be referred to as an "insulating element" or "insulator." It will be appreciated that the first set 50 of rollers 52*a*, 52*b* are necessary only if an automatic cord feeding option is desired. Therefore, the feeding mechanism may comprise other components instead, such as only a set of rollers nearer to a melting zone as described below, or even other types of feeding mechanisms are possible as well.

Figure 4:
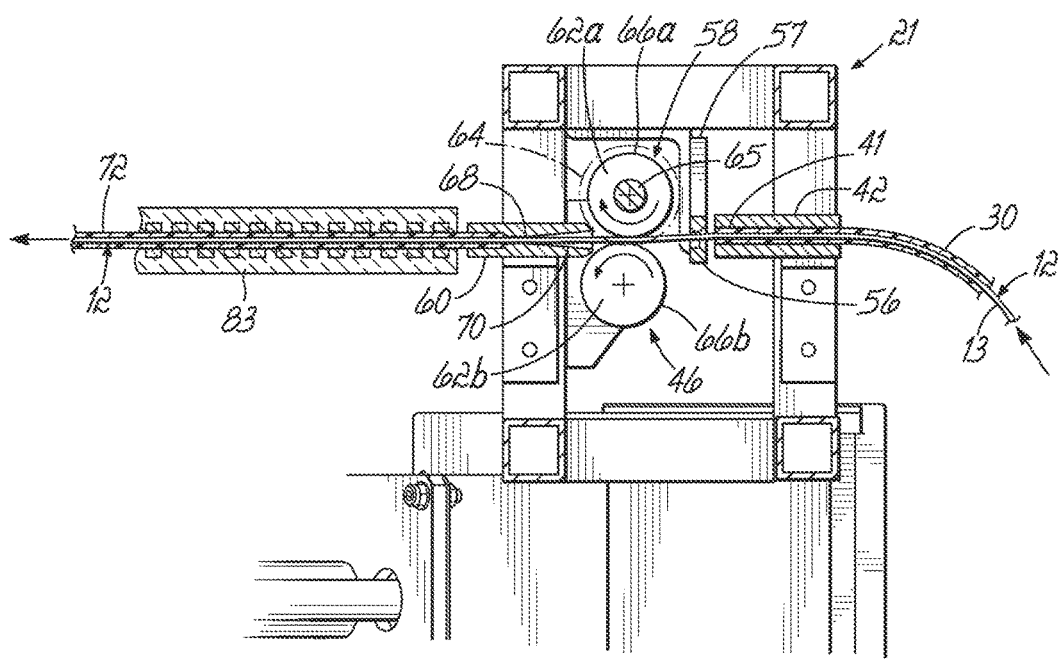
FIG. 4 is a detailed side view, in partial cross-section, of certain portions of the system of FIG. 1.

The second set of rollers 58 includes a second driven roller 62*a* that is operably connected to a second motor 64 via a second drive shaft 65, and a second idler roller 62*b*. This second set 58 is capable of pulling the cord through the system even if the first set of rollers 50 is not used. The second set of rollers 58 is positioned such that the outer surfaces 66*a*, 66*b* of each roller 62*a*, 62*b*, respectively may frictionally engage opposite sides of the cord 12 to advance the cord 12. In one embodiment, the outer surfaces 66a, 66b may include a textured surface or coating (not shown) that increases their respective coefficients of friction. The second motor 64 is operated to rotate the second drive shaft 65, thus rotating the second driven roller 62a. The second driven roller 62a rotates in a first direction (clockwise as shown in FIG. 4) and the second idler roller 62b rotates in a second direction (counterclockwise as shown in FIG. 4). The second set of rollers 58 is positioned engage the cord 12 and advance the cord 12 into a lumen 68 of the second elongated guide element 60. Lumen 68 includes a tapered portion 70 that allows the cord 12 to more easily enter the lumen 68. In the embodiment shown, each of the driven rollers 52a, 62a operates via different motors 48, 64, allowing for advancement of the cord 12 even if the cord 12 becomes broken in between the two driven rollers 52a, 62a. The tube 30 is also advantageous in the event that the cord 12 becomes broken between the first and second sets of rollers 50, 58, the cord may still be directed from the first support structure 18 and towards the second support structure 21. In one embodiment, each of the rollers 52a, 52b, 62a, 62b is a one way roller such that they are configured to rotate in only one direction. Moreover, in one embodiment, each of the rollers 52a, 52b, 62a, 62b is torque limited, as described in more detail below. For example, as described in more detail below, the pressure may increase within the system 10 and the liquid adhesive 71 may tend to urge the cord 12 in the direction away from the supply conduit 72. Due to the frictional engagement and one way configuration of the rollers 52a, 52b, 62a, 62b, the cord 12 would be able to maintain its position, even if the liquid adhesive tended to urge the cord 12 in the direction away from the supply conduit 72.

Also referring also to FIGS. 4A-B and 5 through 7, the cord 12 is advanced through the insulator 60 and enters a supply conduit 72. As shown, downstream of and fluidly connected with the supply conduit 72 is a heat exchange device 74, a manifold 76, and an adhesive dispensing device 78. The heat exchange device 74, in one embodiment, is substantially similar to that described in U.S. Provisional Patent Application Ser. No. 61/878,254, entitled HEAT EXCHANGE DEVICES, LIQUID ADHESIVE SYSTEMS, AND RELATED METHODS (Nordson Corporation, Westlake, Ohio). The '254 Application is incorporated herein by reference, in its entirety. A portion of the cord 12 of hot melt adhesive is melted such that a supply of liquid adhesive 71 is formed in the supply conduit 72. The liquid adhesive 71 then travels through the heat exchange device 74, the manifold 76 and to the dispenser 78, where it is ultimately dispensed onto a substrate 80. More particularly, in the embodiment shown, the supply conduit 72 includes a first heating element 82 in the form of a heater cable 82 wrapped along at least a portion of a length of the supply conduit 72. In one embodiment, the supply conduit 72 is made from a heat conducting material such as aluminum. In the embodiment shown, the heater cable 82 is a 208 Watt heater cable. The heater cable 82 includes an insulating cover 83. The heat exchange device 74, as described in the '254 application, is configured to condition the adhesive for application onto a substrate 80. In that regard, the heat exchange device 74 includes a second heating element 84 that heats the liquid adhesive 71 to an application temperature suitable for an adhesive bonding application. In one embodiment, the second heating element 84 is a 100 W cartridge heater. The manifold 76 includes a third heating element 86 that is configured to maintain the liquid adhesive 71 at the application temperature. The third heating element 86, in one embodiment, is a 750 W cartridge heater. Any one of the three heating elements 82, 84, 86 may be turned off and on, depending on whether the system 10 is operating (i.e., whether liquid adhesive 71 is being dispensed). For example, when the system 10 is not operating, the second and third heating elements 84, 86 may be powered off, or their power output reduced. Each of the heating elements 82, 84, 86 includes at least one PID controller 87a, 87b, 87c controlling each of the heating elements 82, 84, 86, respectively. In one embodiment, each of the heating elements 82, 84, 86 is in communication with three PID controllers (only one shown to be communicating with each heating element 82, 84, 86). The control module 28 includes various controls that allow a user to adjust the temperature and on and off states of any of the three heating elements 82, 84, 86. The control system is optionally designed and configured to ensure that the heat exchange device, and heating elements 82, 84, 86 are controlled to lower the temperature applied to the adhesive, as needed, to avoid degradation and/or char of the adhesive, especially during non-peak demand times. On the other hand, when a peak demand time is detected, such as by a pressure drop in the liquid adhesive being supplied, then the applied temperatures may be increased in a coordinated manner to increase the melt rate and volume of liquefied adhesive being supplied.

Figure 3:
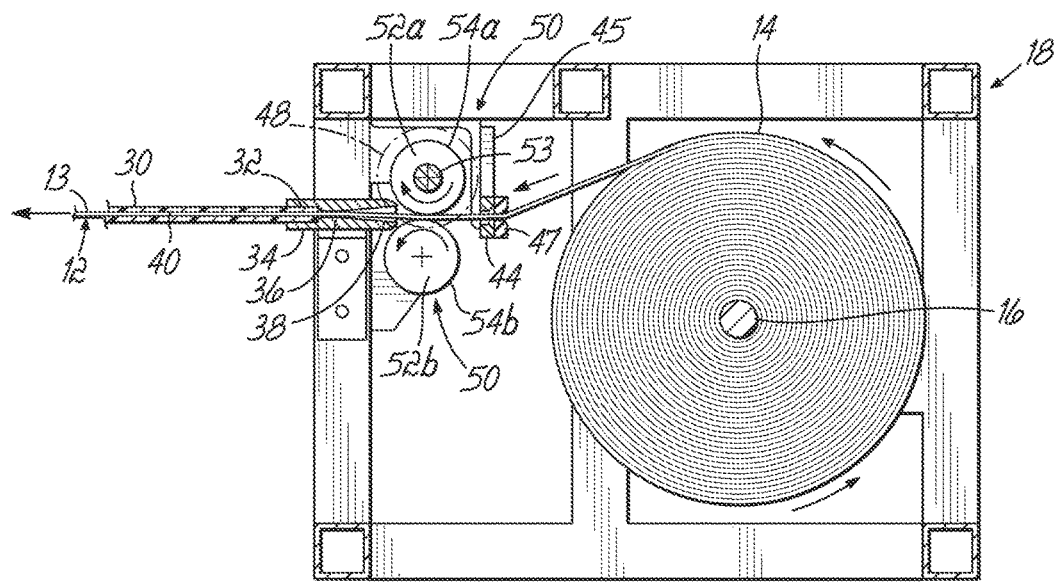
FIG. 3 is a detailed side view, in partial cross-section, of certain portions of the system of FIG. 1.

In one embodiment, a wiper element 47, such as, for example, a rubber grommet or brush-like element, may be provided within the system 10 for removing dust or other contaminants that may accumulate on the surface of the cord 12. The wiper element 47 may be advantageously located at a point in the system 10 downstream of where the cord 12 has been exposed to the environment and upstream of the supply conduit 72. For example, the wiper element 47 may be located upstream of, and adjacent to, the first guide member 44, as shown in FIG. 3. In addition or alternatively, the wiper element 47 may be located upstream of the second guide member 56, such as, for example, between the second guide member 56 and the tube 30 (not shown). In other embodiments, the wiper element 47 may be formed integrally with one or both of the first or second guide members 44, 56.

Figure 4A:
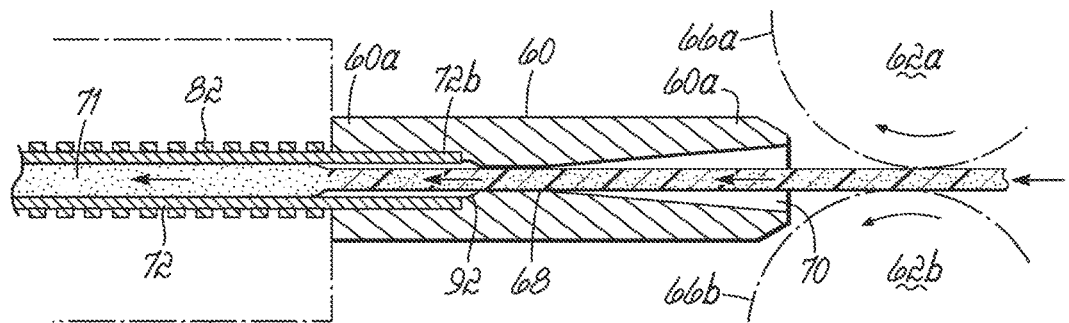
FIG. 4A is a view similar to FIG. 4, showing further detail.
Figure 4B:
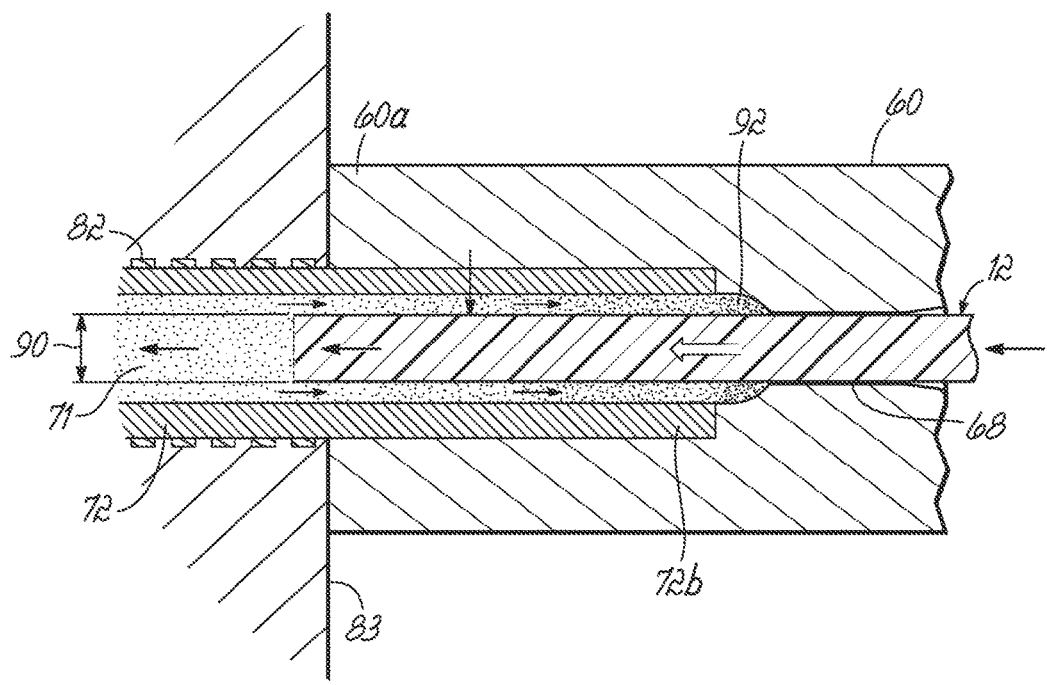
FIG. 4B is a view similar to FIG. 4A, showing even further detail.
Figure 5:
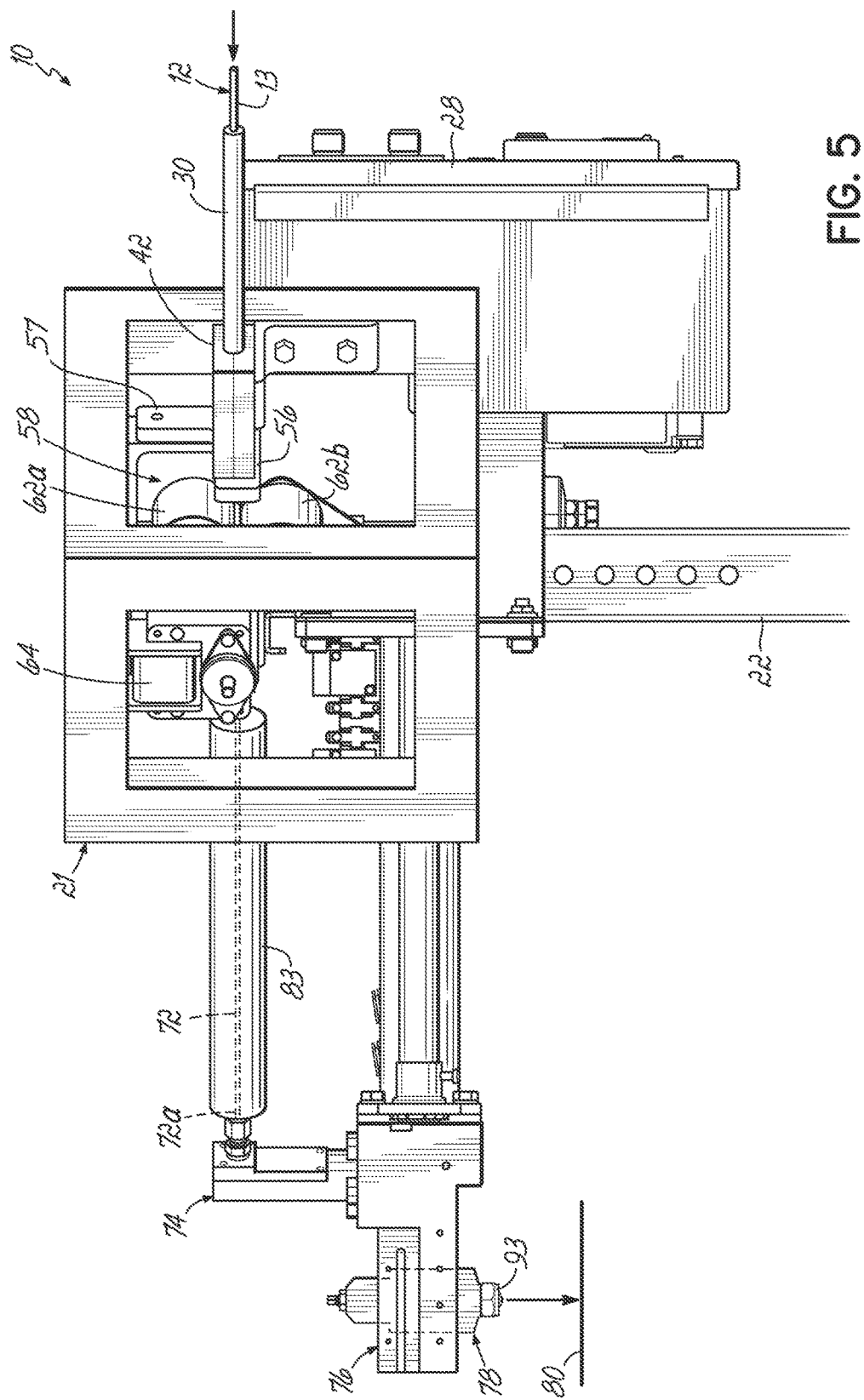
FIG. 5 is a rear side view of the system of FIG. 1.
Figure 6:
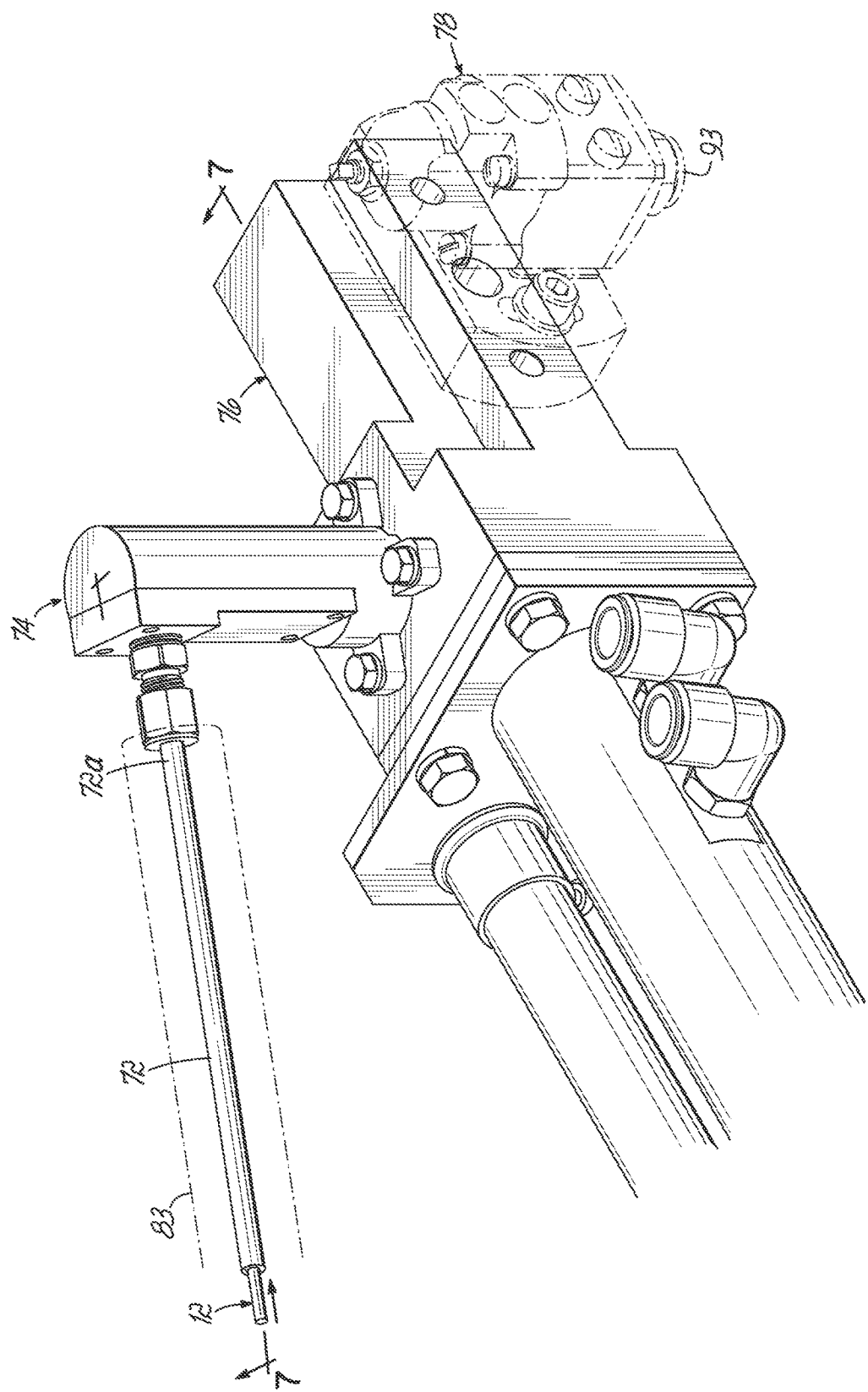
FIG. 6 is a detailed perspective view of the system of FIG. 1.

Referring to FIGS. 4, 4A, and 4B, as the cord 12 enters the supply conduit 72 and is exposed to the heat from the first heating element 82, it begins to melt and form a supply of liquid adhesive 71 within the supply conduit 72. If the cord is a two layer cord 12" and includes a coating material 13a, then the coating material also begins to melt and is folded into the liquid adhesive 71. Thus, as the still solid portion of the cord 12 is driven by rollers 52a, 52b, 62a, 62b, the cord 12 essentially acts as a piston forcing the liquid adhesive 71 towards the distal end 72a of the supply conduit 72. Because the system 10 is essentially closed at the dispenser 78 (e.g. by a valve member, as described in more detail below), a back pressure builds up within supply conduit 72. This results in some of the liquid adhesive 71 being forced back towards the proximal end 72b of the supply conduit 72 around the outer diameter 90 of the still solid, incoming cord 12. Thus, a seal may be provided in order to prevent the backflow of liquid adhesive from flowing out of insulator 60. Because of the insulative properties of the insulator 60, the temperature of the insulator 60 is much lower than that of the heated supply conduit 72. More particularly, there is a thermal gradient (from left to right as shown in FIG. 4) within the insulator 60, with the temperature gradually decreasing from the distal end 60a of the insulator 60 to the proximal end 60b of the insulator 60. Because of the temperature gradient, a portion of the backflow of liquid adhesive 71 solidifies and hardens around the incoming cord 12 as it flows further into the insulator lumen, thus forming a generally annular plug 92 shown in FIGS. 4A-B. The plug 92 forms an effective hydraulic seal around the still solid, incoming cord 12. Forming such a seal with the plug 92 is advantageous in that it allows pressure to be built up in the system 10, mainly between the plug 92 and the nozzle 93 of the dispensing device 78. By allowing pressure to build between the plug 92 and the nozzle 93, liquid adhesive 71 may be dispensed from the nozzle 93 in a pressurized, forceful manner. For example, liquid adhesive 71 may be forcefully dispensed, such as extruded or sprayed from the nozzle 93.

The system 10 may be configured to maintain a predetermined pressure level of liquid adhesive 71. The predetermined pressure level may be between approximately 30 psi and approximately 190 psi in order to accommodate for various types of non-contact dispensing devices. The pressure may be maintained by controlling the amount of liquid adhesive 71 within the system 10. Therefore, the pressure may be maintained by controlling the advancement of the cord 12 relative to the supply conduit 72, and thus the amount of liquid adhesive 71 that is created due to the cord 12 being melted. For example, when a volume of liquid adhesive 71 is dispensed from the dispensing device 78, the volume within the system 10 slightly decreases. Thus, in order to return the pressure to the predetermined pressure level within the system 10, or to increase the pressure in general, the cord 12 may be advanced by the feeding mechanism 46 in order to melt additional portions of the cord 12. While the system 10 described by way of example here is limited to 190 psi, higher friction on the rollers 52a, 62a, optimal guiding at the tapered portion 70, and higher pressures are desirable.

In one embodiment, the system 10 includes a pressure sensor 94 (FIG. 7) sensing the pressure within the system 10. Particularly, the pressure sensor 94 senses the pressure of liquid adhesive 71 within the system 10. Depending on the pressure sensed by the pressure sensor 94, one or more controllers 96 (FIG. 7) may command the feeding mechanism 46 to operate. For example, the one or more controllers 96 may command either one or both of the first and second motors 48, 64 to operate, thus causing rotation of driven rollers 52a, 62a and advancement of the cord 12. When the pressure level in system 10 reaches the predetermined pressure level, controller(s) 96 cease(s) sending an operation signal to the feeding mechanism motors 48, 64, and motors 48, 64 cease to operate, thus stopping the rotation of driven rollers 52a, 62a. Similarly, in one embodiment, when the system 10 is at the predetermined pressure level, the motors 48, 64 do not operate. In this manner, the pressure sensor 94 may provide a mechanism to prevent overpressurization of the system 10. It should be appreciated that overpressurization may cause the plug 92 to be formed or pushed deeper into the insulator 60 (e.g. into the lumen 68) than may be desired, which may cause undesirable drag upon the cord 12 as it is advanced. Moreover, it may also be important to control the maximum pressure in the system 10 to limit the hammerhead on the start of dispensing, and to protect the valve member (described below) from damage caused by overpressure.

Figure 7:
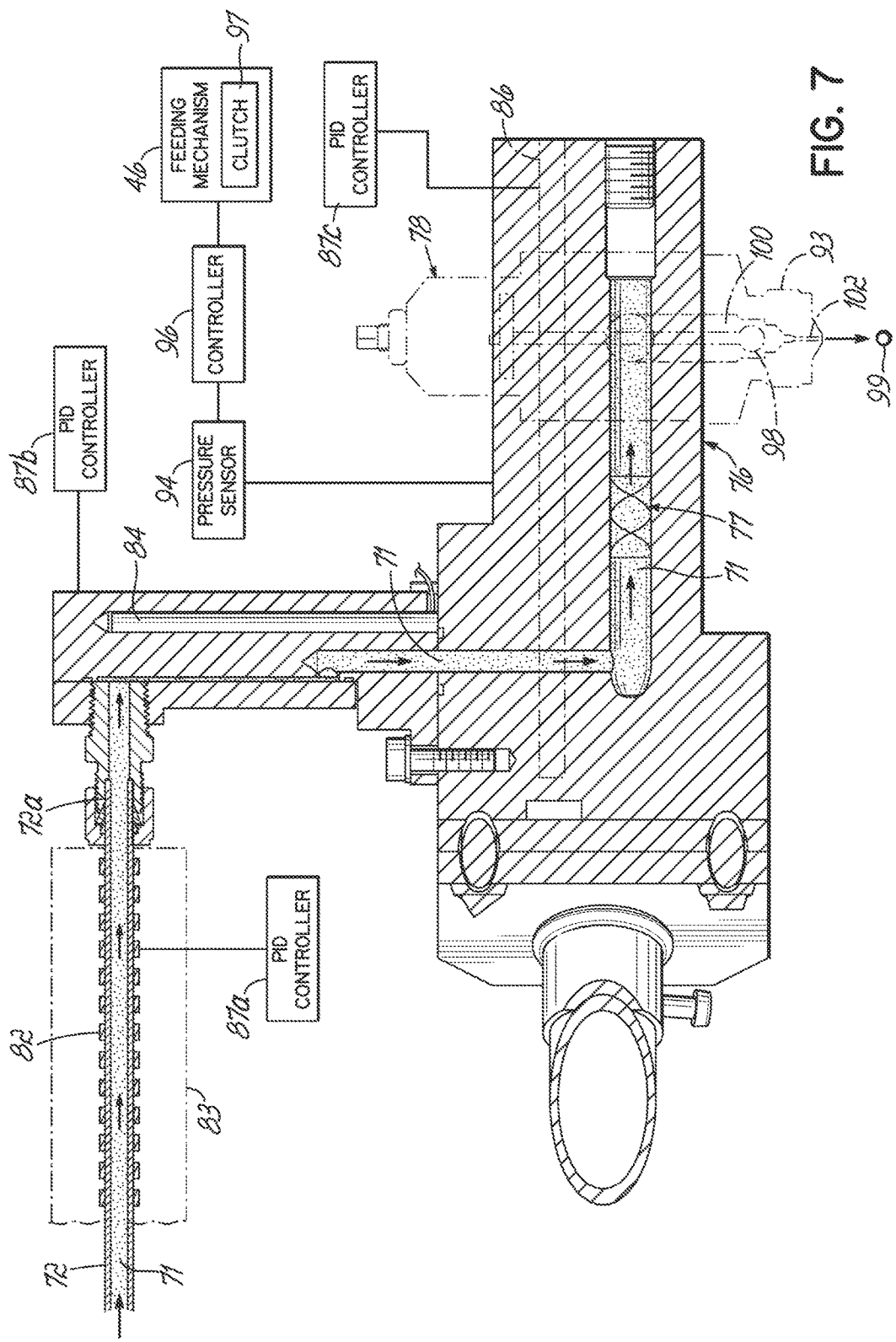
FIG. 7 is a detailed view, in partial cross-section, of certain portions of the system of FIG. 1.

There may be lag time between when the pressure sensor 94 senses that the system 10 has reached the predetermined pressure level and when the motors 48, 64 are commanded to cease operation by the at least one controller 96. Thus, one or both of the driven rollers 52a, 62a may continue to rotate for a period of time after the system 10 has reached the predetermined pressure level. Therefore, in one embodiment, one or both of the driven rollers 52a, 62a may be torque limited by, for example, a clutch mechanism 97 (FIG. 7). The torque limitation provides an additional, or alternative, mechanism to prevent overpressurization of the system 10. In an embodiment where the pressure sensor 94 is not used, the clutch mechanism 97 may prevent overpressurization on its own. Such an embodiment may be less expensive and less complicated than one where both the pressure sensor 94 and the clutch mechanism 97 are used. However, if both the pressure sensor 94 and the clutch mechanism 97 are used, one may provide a back-up or failsafe for the other. Each clutch mechanism 97 allows the selective engagement and disengagement of a respective roller 52a, 62a, and a drive shaft 53, 65. The clutch mechanism 97 allows the drive shafts 53, 65 and rollers 52a, 62a to selectively engage when the torque required to turn the driven rollers 52a, 62a is below a certain amount and disengage when the torque required to turn the driven rollers 52a, 62a is above a certain amount.

The torque required to turn the rollers 52a, 62a is directly related to the pressure of liquid adhesive 71 within the system 10. Because the cord 12 of adhesive essentially acts as a piston for advancing the liquid adhesive 71 within the supply conduit 72 and further within the system 10, the cord 12 must be advanced by the rollers with a force (i.e., frictional and tangent forces) sufficient to allow the cord 12 to overcome the pressure in the system 10 and advance. Assuming a sufficient amount of friction between a pair of rollers 50, 58 and the cord 12, the drive shaft 53, 65 must provide a sufficient amount of torque that allows the rollers 50, 58, respectively to provide this force that advances the cord 12. Where the pressure of the liquid adhesive 71 in the system 10 is already at the predetermined pressure level, however, it would be undesired to provide this force to advance the cord 12, and thus undesirable to provide the torque required to provide such a force. Rollers 52a, 62a are one way clutched rollers that freely rotate in one direction and allow the motors 48, 64 to drive the rollers 52a, 62a in the other direction. This allows the motors to feed the cord 12 and also prevents the two motors 48, 64 from fighting each other if one were to feed faster than the other. In that case, the clutched roller coupled to the slower motor would just freely spin.

On the other hand, however, when the pressure level is below the predetermined pressure level (such as just after an amount of liquid adhesive 71 has been dispensed from the system 10) the pressure of liquid adhesive 71 in the system 10 decreases and therefore the torque required to advance the cord 12 is below the certain level of torque. In that event, the clutch mechanism 97 allows the engagement of the drive shafts 53, 65 and the driven rollers 52a, 62a, and therefore allows rotation of the roller wheel and advancement of the cord 12. Either one or both of the sets of rollers 50, 58 may be torque limited as described hereinabove. The torque limiting feature is also advantageous in that, in the event that one or the other of the sets of rollers 50, 58 rotates faster than the other, the slower set of rollers 50, 58 would be able to slip.

In certain embodiments, the system may be configured to limit advancement of the feeding mechanism 46 in response to exceeding a predetermined fluid pressure. The clutch mechanism 97 can be configured to limit the torque applied by the feeding mechanism 46 to advance the cord 12 when the fluid pressure against the cord 12 exceeds a predetermined fluid pressure. The pressure sensor 94 can be configured to sense a fluid pressure in the manifold 76, wherein the pressure sensor 94 may be coupled to a controller 96 of the feeding mechanism 46.

Controlling the pressure within the system 10 allows the system 10 to be used with a variety of dispensing devices for non-contact application, which is a mode of application where the substrate 80 is spaced greater than one bead width away from the nozzle 93. In non-contact application, fluid velocity carries the adhesive to the substrate, rather than a substrate in close proximity pulling the fluid from the nozzle with relative motion. Without building up pressure within the system 10, non-contact application is not feasible. In one embodiment, the dispensing device 78 shown is a traditional dispensing device 78 having a valve member 98 that is mounted for movement within a fluid passage 100 of the dispenser 78. When the valve member 98 closes the outlet 102, the system 10 is closed at the dispenser 78 and pressure may be built within the system, as previously described. In order to dispense the liquid adhesive 71, the valve member 98 is moved away from the nozzle outlet 102. Because the liquid adhesive 71 is at the predetermined pressure level, a bead or droplet 99 of liquid adhesive 71 is forced out under the pressure and dispensed onto the substrate 80. The valve member 98 may be subsequently returned to again close the nozzle outlet 102 and therefore close the system 10 and allow fluid pressure to be rebuilt in preparation for further dispensing. In one embodiment, upon opening the valve member 98, the pressure outside of the system 10 (e.g. atmospheric pressure) and the fluid pressure within the system may balance, such that the pressure needed to force the liquid adhesive 71 through the fluid passage 100 equals the pressure generated by a fixed speed delivery, thereby resulting in a metered application or dispensing. As shown, the valve member 98 may be an on/off valve member. In another embodiment, the dispensing device 78 may include a variable flow valve member for closing the outlet 102 such that pressure may be built within the system 10 in a more adjustable manner. For example, the valve member 98 may be a needle valve. In another embodiment, the dispensing device 78 may be a jetting dispenser, such as the one disclosed in U.S. Provisional Patent Application No. 61/940,060, titled JETTING DISPENSER, AND A METHOD FOR JETTING DROPLETS OF FLUID MATERIAL (Nordson Corporation). The '060 application is hereby incorporated by reference, in its entirety. In still another embodiment, the manifold 76 may include a static mixer 77 positioned upstream of the dispensing device 78. If the cord is a two layer cord 12" and includes a coating material 13a, the static mixer 77 may ensure that the liquefied coating material is adequately mixed into the liquid adhesive 71 prior to dispensing. In some embodiments, the manifold 76 can include a plurality of dispensing devices 78, where each dispensing device 78 includes at least one valve member 98.

Figure 8:
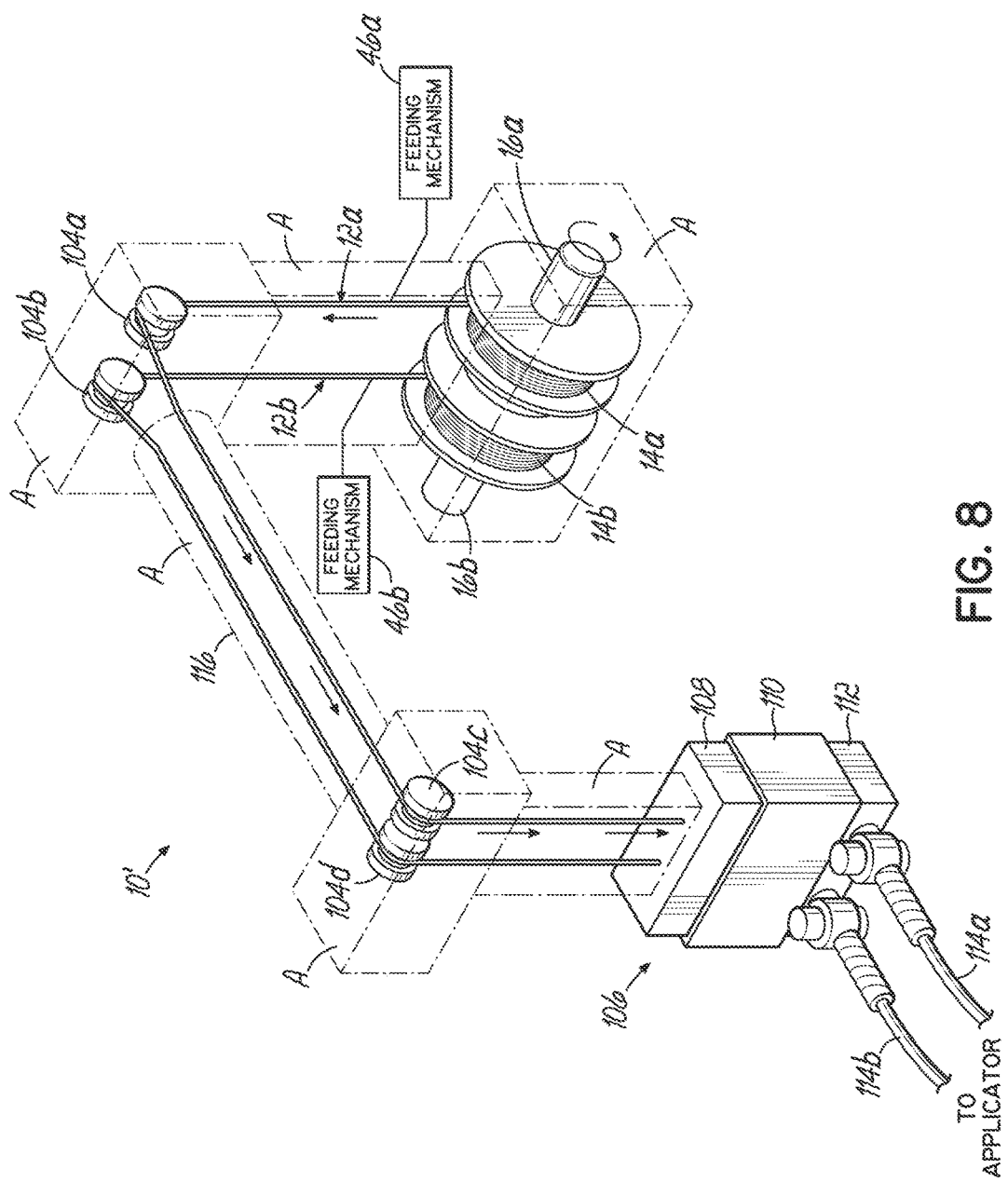
FIG. 8 is an alternative embodiment of a system for dispensing hot melt adhesives.

Referring now to FIG. 8, in one embodiment, a system 10' may include first and second spools 14a, 14b of cords 12a, 12b mounted for rotation on respective spool axles 16a, 16b. However, it will be appreciated that any number of spools may be used as desired. The system 10' may further include first and second feeding mechanisms 46a, 46b that feed the cords 12a, 12b into, and advance the cords 12a, 12b relative to other parts of the system 10' in a manner similar to that previously described with respect to system 10. In addition or alternatively, the spool axles 16a, 16b themselves may be driven by a motor (not shown). As shown, the first and second feeding mechanisms may operate independently from each other, such that, for example, cord 12a may be advanced from the first spool 14a while the second spool 14b remains stationary, such as in a standby position. When cord 12a has been consumed, or if cord 12a breaks, cord 12b may be advanced from the second spool 14b. In the embodiment shown, the cords 12a, 12b are fed along intermediate pulleys 104a, 104b, 104c, 104d through exposed areas A to a melt station 106. The pulleys 104a, 104b, 104c, 104d may be driven by a motor (not shown) or may be idle. It will be appreciated that in certain embodiments, such as, for example, when a hot melt PSA is used, the cords 12a, 12b may easily stretch. In such embodiments, it may be advantageous to use driven spool axles 16a, 16b and driven pulleys 104a, 104b, 104c, 104d operating at predetermined speeds so as to maintain a desired level of tension in the cords 12a, 12b. In addition or alternatively, the cords 12a, 12b may be fed through a rail or tube (not shown) to the melt station 106. The melt station 106 may include a series of manifolds 108, 110, 112, which may contain, for example, a feeding mechanism, a heater, and a flow meter, respectively. The heater may be configured in a manner previously described and melts the cords 12a, 12b into liquid adhesive. Liquid adhesive exits the heater and flows through manifold 112 into respective hoses 114a, 114b which connect to applicators (not shown). In one embodiment, the manifold 112 contains gear pumps and may provide closed loop flow control to enable precise dispensing without time delay. For example, the manifold 112 may be equipped with a TRU-FLOW™ Meter sold by Nordson Corp., Westlake, Ohio.

As previously described, it is understood that many solid hot melt adhesives may degrade or prematurely cure due to moisture in atmosphere or other environmental conditions. Therefore, it may be desirable to protect the cords 12a, 12b in the exposed areas A. In the embodiment shown, a protective housing 116 encloses the exposed areas A such that the cords 12a, 12b are exposed only to the environment within the housing. Notably, the cords 12a, 12b would otherwise be exposed to the surrounding environment, such as open air, when traveling through the exposed areas A. The housing 116 surrounds the spools 14a, 14b and the path of the cords 12a, 12b from the spools to the melt station 106. The pulleys 104a, 104b, 104c, 104d guide the cords 12a, 12b through the housing 116. The housing 116 may be, for example, a simple clear duct or pipe, such that the path of the cords 12a, 12b may be visible to an operator. In one embodiment, the housing 116 may be filled with dry gas, such as, for example, dry air, to prevent degradation or premature curing of the cords 12a, 12b caused by high temperature or humidity. The dry air may also keep the surface of the cords 12a, 12b dry until entering the melt station 106 to ensure that the cords do not carry moisture into the heater. This may reduce the risk of undesirable cavitation, which can destabilize the downstream pressure. The housing 116 may also prevent any physical damage to the cords 12a, 12b as they travel through the exposed areas A.

Figure 9:
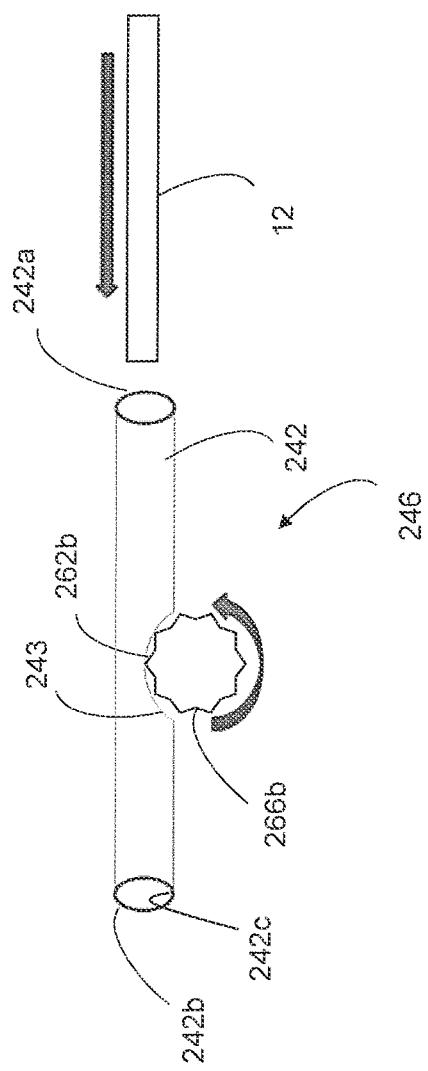
FIG. 9 is a side view of an alternative embodiment of a feeding mechanism.

Referring now to FIG. 9, in another embodiment, a cord 12 may be fed into a feeding mechanism 246. In an embodiment, the feeding mechanism 246 can be installed in the support structure 21 of FIG. 4 in place of the feeding mechanism 46. The cord 12 may enter a first end 242a of the guide member 242 where the cord 12 may be advanced by a wheel 266b. In certain embodiments, the guide member 242 can have an opening 243 to receive the wheel 266b. The second end 242b of the feeding mechanism 246 may be aligned with the lumen 68 of the second elongated guide element 60 (FIG. 4) such that the cord 12 can be advanced into the second elongated guide element 60 by the wheel 266b. In some embodiments, the guide member 242 advantageously prevents the cord 12 from bending between the wheel 266*b* and the second elongated guide element 60. A coating with a low coefficient of friction such as polytetrafluoroethylene (e.g. Teflon) can be applied to an interior surface 242*c* of the guide member 242 to reduce friction of the cord 12 on the interior surface 242*c* of the guide member 242.

While the present invention has been illustrated by the description of specific embodiments thereof, and while the embodiments have been described in considerable detail, it is not intended to restrict or in any way limit the scope of the appended claims to such detail. The various features discussed herein may be used alone or in any combination. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of the general inventive concept.

What is claimed is:

1. A system for dispensing hot melt adhesives, the system comprising:
    an adhesive dispenser comprising a fluid passage leading to an outlet;
    a supply conduit fluidly connected to the fluid passage;
    a feeding mechanism configured to feed an elongate, flexible element of solid hot melt adhesive into the supply conduit;
    a first heating element positioned along at least a portion of the supply conduit to melt a portion of the elongate, flexible element being fed into the supply conduit and thereby form a supply of liquid adhesive within the supply conduit;
    a valve member mounted for movement between open and closed positions within the fluid passage, wherein the valve member allows fluid pressure to build in the system when the valve member is in the closed position;
    a heat exchange device comprising a second heating element between the supply conduit and the fluid passage, the heat exchange device configured to heat the liquid adhesive to an application temperature suitable for an adhesive bonding application;
    a manifold between the heat exchange device and the adhesive dispenser, the manifold comprising a third heating element configured to maintain the liquid adhesive at the application temperature; and
    a pressure sensor configured to sense a fluid pressure in the manifold, wherein the pressure sensor is coupled to a feedback controller of the feeding mechanism.

2. The system of claim 1, wherein the first heating element further comprises:
    a heater cable wrapped about at least a portion of the supply conduit.

3. The system of claim 1, further comprising:
    a pressure sensor configured to sense a pressure of liquid adhesive in at least one portion of the system; and
    a controller in communication with the pressure sensor, the controller configured to control the feeding mechanism.

4. A system for dispensing hot melt adhesives, the system comprising:
    an adhesive dispenser comprising a fluid passage leading to an outlet;
    a supply conduit fluidly connected to the fluid passage;
    a feeding mechanism configured to feed an elongate, flexible element of solid hot melt adhesive into the supply conduit;
    a first heating element positioned along at least a portion of the supply conduit to melt a portion of the elongate, flexible element being fed into the supply conduit and thereby form a supply of liquid adhesive within the supply conduit; and
    a valve member mounted for movement between open and closed positions within the fluid passage, wherein the valve member allows fluid pressure to build in the system when the valve member is in the closed position,
    wherein a portion of the supply of liquid adhesive solidifies around a portion of the elongate, flexible element and thereby forms an annular plug within at least a portion of the supply conduit.

5. The system of claim 4, wherein the elongate, flexible element further comprises a cord, a flat ribbon, or is in the form of a spool.

6. The system of claim 4, wherein the elongate, flexible element further comprises a coating material covering the solid hot melt adhesive to protect the solid hot melt adhesive from the environment.

7. The system of claim 6, wherein the coating material comprises a meltable polymer.

8. The system of claim 1, wherein the feeding mechanism further comprises:
    at least one roller configured to frictionally engage the elongate, flexible element in order to feed and advance the elongate, flexible element; and
    a motor operably coupled to the at least one roller.

9. The system of claim 8, further comprising:
    a torque limiting mechanism configured to selectively disengage the motor and the at least one roller when a pressure of liquid adhesive in the system is at a predetermined pressure level.

10. The system of claim 8, wherein the at least one roller further comprises:
    a set of rollers positioned to engage different portions of the elongate, flexible element and advance the elongate, flexible element relative to the supply conduit.

11. The system of claim 10, wherein one of the rollers in the set of rollers is a driven roller and the other of the rollers in the set of rollers is an idler roller.

12. The system of claim 1, further comprising:
    a tube having a first end positioned downstream of a first portion of the feeding mechanism, and a second end positioned upstream of a second portion of the feeding mechanism, the tube comprising a lumen between the first and second ends sized to receive and allow movement of the elongate, flexible element therethrough.

13. The system of claim 12, wherein:
    the first portion of the feeding mechanism further comprises a first set of rollers configured to frictionally engage the elongate, flexible element in order to feed the elongate, flexible element into the lumen at the first end of the tube; and
    the second portion of the feeding mechanism further comprises a second set of rollers configured to frictionally engage the elongate, flexible element after the elongate, flexible element has exited from lumen at the second end of the tube and feed the elongate, flexible element into the supply conduit.

14. The system of claim 1, wherein the valve member is an on/off valve member.

15. The system of claim 1, wherein the valve member is a variable flow valve member.

16. The system of claim 1, further comprising:
at least one exposed area disposed between a portion of the feeding mechanism and the first heating element, wherein the elongate, flexible element is fed through the exposed area; and
a protective housing enclosing the at least one exposed area.

17. The system of claim 16, wherein the protective housing is filled with dry air that lacks moisture.

18. The system of claim 1, wherein the system is configured to limit advancement of the feeding mechanism in response to exceeding a predetermined fluid pressure.

19. The system of claim 18, further comprising a clutch, the clutch being configured to limit torque applied by the feeding mechanism to advance the flexible element when the fluid pressure against the flexible element exceeds the predetermined fluid pressure.

20. The system of claim 1, further comprising a wiper element positioned upstream of the supply conduit.

21. The system of claim 1, further comprising a manifold comprising a plurality of dispensing devices.

22. The system of claim 21, wherein each of the plurality of dispensing devices comprises at least one valve member.

23. The system of claim 9, wherein the predetermined pressure level is between 30 psi and 190 psi.

24. The system of claim 1, further comprising:
at least one exposed area positioned between a portion of the feeding mechanism and the first heating element, wherein the elongate, flexible element is fed through the exposed area; and
a protective housing enclosing the at least one exposed area.

25. The system of claim 24, wherein the protective housing is filled with a dry gas that lacks moisture.

26. The system of claim 24, wherein the protective housing extends from the portion of the feeding mechanism to the supply conduit.

27. The system of claim 4, wherein the feeding mechanism further comprises:
at least one roller configured to frictionally engage the elongate, flexible element in order to feed and advance the elongate, flexible element; and
a motor operably coupled to the at least one roller.

28. The system of claim 27, further comprising:
a torque limiting mechanism configured to selectively disengage the motor and the at least one roller when a pressure of liquid adhesive in the system is at a predetermined pressure level.

29. The system of claim 27, wherein the at least one roller further comprises:
a set of rollers positioned to engage different portions of the elongate, flexible element and advance the elongate, flexible element relative to the supply conduit.

30. The system of claim 29, wherein one of the rollers in the set of rollers is a driven roller and the other of the rollers in the set of rollers is an idler roller.

31. The system of claim 4, further comprising:
a tube having a first end positioned downstream of a first portion of the feeding mechanism, and a second end positioned upstream of a second portion of the feeding mechanism, the tube comprising a lumen between the first and second ends sized to receive and allow movement of the elongate, flexible element therethrough.

32. The system of claim 31, wherein:
the first portion of the feeding mechanism further comprises a first set of rollers configured to frictionally engage the elongate, flexible element in order to feed the elongate, flexible element into the lumen at the first end of the tube; and
the second portion of the feeding mechanism further comprises a second set of rollers configured to frictionally engage the elongate, flexible element after the elongate, flexible element has exited from lumen at the second end of the tube and feed the elongate, flexible element into the supply conduit.

33. The system of claim 4, wherein the valve member is an on/off valve member.

34. The system of claim 4, wherein the valve member is a variable flow valve member.

35. The system of claim 4, further comprising:
at least one exposed area disposed between a portion of the feeding mechanism and the first heating element, wherein the elongate, flexible element is fed through the exposed area; and
a protective housing enclosing the at least one exposed area.

36. The system of claim 35, wherein the protective housing is filled with dry air that lacks moisture.

37. The system of claim 4, wherein the system is configured to limit advancement of the feeding mechanism in response to exceeding a predetermined fluid pressure.

38. The system of claim 37, further comprising a clutch, the clutch being configured to limit torque applied by the feeding mechanism to advance the flexible element when the fluid pressure against the flexible element exceeds the predetermined fluid pressure.

39. The system of claim 4, further comprising a wiper element positioned upstream of the supply conduit.

40. The system of claim 4, further comprising a manifold comprising a plurality of dispensing devices.

41. The system of claim 40, wherein each of the plurality of dispensing devices comprises at least one valve member.

42. The system of claim 28, wherein the predetermined pressure level is between 30 psi and 190 psi.

43. The system of claim 4, further comprising:
at least one exposed area positioned between a portion of the feeding mechanism and the first heating element, wherein the elongate, flexible element is fed through the exposed area; and
a protective housing enclosing the at least one exposed area.

44. The system of claim 43, wherein the protective housing is filled with a dry gas that lacks moisture.

45. The system of claim 43, wherein the protective housing extends from the portion of the feeding mechanism to the supply conduit.

* * * * *